(12) United States Patent
Gil et al.

(10) Patent No.: US 7,727,294 B2
(45) Date of Patent: Jun. 1, 2010

(54) THIN MICRO REFORMING APPARATUS HAVING REDUCED BACK PRESSURE IN EVAPORATOR THEREOF

(75) Inventors: Jae Hyoung Gil, Seoul (KR); Jae Hyuk Jang, Kyungki-do (KR); Sung Han Kim, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 302 days.

(21) Appl. No.: 11/544,617

(22) Filed: Oct. 10, 2006

(65) Prior Publication Data

US 2007/0081929 A1    Apr. 12, 2007

(30) Foreign Application Priority Data

Oct. 10, 2005    (KR)    ...................... 10-2005-0095085

(51) Int. Cl.
  *B01J 10/00*    (2006.01)
  *B01J 3/00*    (2006.01)
(52) U.S. Cl. ....................... 48/127.9; 422/189; 422/242
(58) Field of Classification Search .......... 422/129–242
  See application file for complete search history.

(56) References Cited

U.S. PATENT DOCUMENTS

| 6,838,062 B2 | 1/2005 | Goebel et al. | |
| 2003/0190508 A1* | 10/2003 | Takeyama et al. | 429/20 |
| 2005/0188617 A1* | 9/2005 | Ogura et al. | 48/127.9 |
| 2007/0071659 A1* | 3/2007 | Gil et al. | 422/189 |

FOREIGN PATENT DOCUMENTS

| DE | 199 09 725 C2 | 9/2000 |
| DE | 199 63 594 A1 | 7/2001 |
| DE | 102 50 793 A1 | 5/2004 |
| JP | 2003-48701 | 2/2003 |
| JP | 2003-48701 A | 2/2003 |

(Continued)

OTHER PUBLICATIONS

German Office Action, with English Translation, issued in German Patent Application No. DE 10 2006 047 151.2-41, received on Oct. 31, 2007.

*Primary Examiner*—Alexa D Neckel
*Assistant Examiner*—Imran Akram
(74) *Attorney, Agent, or Firm*—McDermott Will & Emery LLP (57) ABSTRACT

The invention relates to a thin micro reforming apparatus used in a fuel cell system with decreased back pressure in an evaporator thereof. In the reforming apparatus, a substrate has a flow path therein and a fuel inlet portion for introducing fuel into the flow path of the substrate. An evaporator includes a gas expansion part which gasifies the liquid fuel and a back pressure accommodation part which accommodates back pressure during the gasification to block the influence of the back pressure to the fuel inlet portion. A reformer has a flow path formed downstream of the evaporator, reforming fuel into hydrogen gas via heat absorption reaction. A CO remover has a flow path formed downstream of the reformer, removing CO gas contained in the hydrogen gas via heat generation reaction. A cover is attached to an upper part of the substrate to seal the substrate from the external environment.

7 Claims, 9 Drawing Sheets

FOREIGN PATENT DOCUMENTS

| | | |
|---|---|---|
| JP | 2004-89748 | 3/2004 |
| JP | 2004-89748 A | 3/2004 |
| JP | 2004-275807 A | 10/2004 |
| JP | 2005-166453 | 6/2005 |
| WO | WO 99/30380 | 6/1999 |

* cited by examiner

Prior art

Prior art

THIN MICRO REFORMING APPARATUS HAVING REDUCED BACK PRESSURE IN EVAPORATOR THEREOF

CLAIM OF PRIORITY

This application claims the benefit of Korean Patent Application No. 2005-95085 filed on Oct. 10, 2005, in the Korean Intellectual Property Office, the disclosure of which is incorporated herein by reference.

BACKGROUND OF THE INVENTION

1. Field of the Invention

The present invention relates to a thin micro reforming apparatus. More particularly, the invention relates to a thin micro reforming apparatus which has a fuel inlet portion in a central portion thereof to supply drops of liquid fuel into an evaporator thereof and allows the liquid fuel to expand in a large space in the evaporator, thereby suppressing the increase of back pressure occurring during the evaporation of the liquid fuel. This prevents backflow of the fuel due to the back pressure and thus there is no need to increase the injection pressure of the fuel and induces good gas flow through the flow paths of the reforming apparatus, ultimately enhancing the reforming capacity of the reforming apparatus.

2. Description of the Related Art

Recently, there have been increased uses of portable small-sized electronic devices including mobile phones, Personal Digital Assistants (PDAs), digital cameras, notebook computers and the like. In particular, since the launch of Digital Multimedia Broadcasting (DMB) through the mobile phones, the portable small-sized terminals are required to have increased power capacity. Lithium ion secondary batteries used in general to date, which have capacity for two-hour viewing of DMB, are undergoing efforts to improve their capacity, but there have been growing expectations on small-sized fuel cells for a more fundamental solution.

In order to realize such a small-sized fuel cell, either direct methanol type in which methanol is directly supplied to a fuel electrode or reformed hydrogen fuel cell (RHFC) type in which hydrogen is extracted from methanol and supplied to a fuel electrode can be adopted. The RHFC type uses hydrogen as fuel as in Polymer Electrode Membrane (PEM) type, thus having advantages in terms of output, power capacity per volume and in that it requires no reactants besides water. However, the method requires a reformer, thus having a disadvantage for miniaturization.

In order for the fuel cell system to obtain high power output density, a reformer is required to convert liquid fuel into gaseous fuel such as hydrogen gas. The reformer includes an evaporating part for gasifying methanol, a reforming part for converting methanol into hydrogen via catalytic reaction at a temperature from 250° C. to 290° C., and a CO removing part for removing CO, a byproduct. In the reforming part, heat absorption reaction takes place and the temperature should be maintained from 250° C. to 290° C. Also in the CO removing part, the temperature should be maintained at about 170° C. to 200° C. to allow effective reaction.

Figure 1:
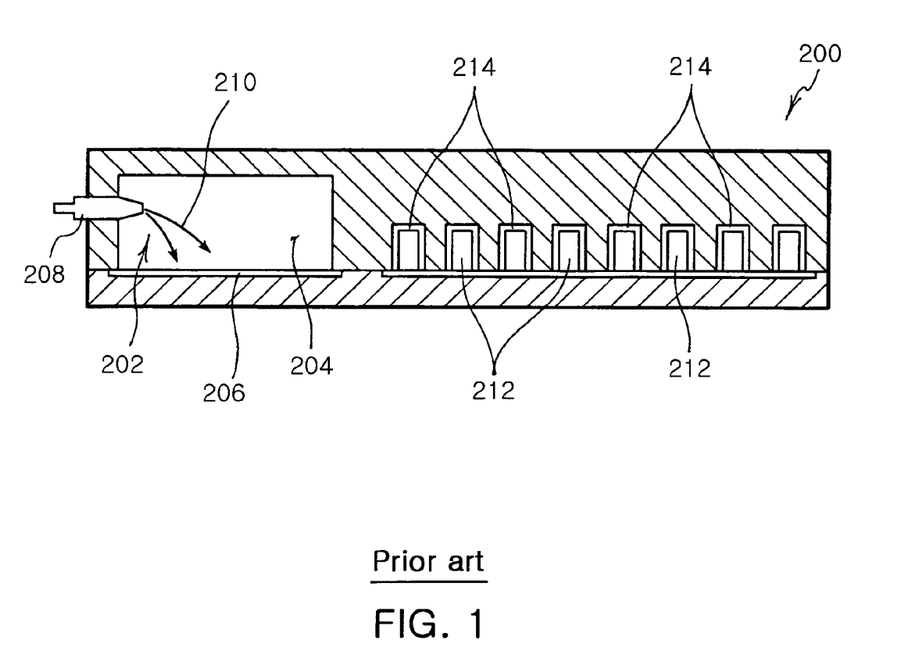
FIG. 1 is a sectional view illustrating a conventional reforming apparatus.

As a conventional example, Japanese Patent Application Publication No. 2003-048701 discloses a reforming apparatus 200 as shown in FIG. 1. As shown in FIG. 1, such a conventional micro reforming apparatus 200 has an inner cavity 204 in an evaporating chamber 202 and a heater 206 for evaporation disposed in the cavity 204. The cavity 204 has a fuel spray 208 therein, which sprays a mixed liquid 210 of the fuel, methyl alcohol and water inside the cavity 204. The sprayed mixed liquid fuel 210 is heated by the heater 206 and evaporated. The gas produced by gasifying the mixed liquid 210 flows through a micro channel 212 and is reformed into hydrogen and carbon dioxide by a reforming catalyst 214 formed in the micro channel 212.

The conventional method is advantageous in that the fuel spray 208 provided at a fuel inlet portion sprays the fuel to increase the surface area of the fuel being reformed, thereby expediting the evaporation. Also, the fuel spray 208 sprays the fuel in the form of droplets, thereby increasing the ratio of the surface area of the fuel to the volume of the fuel. This allows efficient evaporation of the fuel given the same amount of heat.

However, the conventional technology entails burden of separate installation of the fuel spray 208 and a separate controller for regulating the amount of the fuel sprayed by the fuel spray 208. Therefore, the conventional structure is complex and has difficulty in miniaturization.

Figure 2:
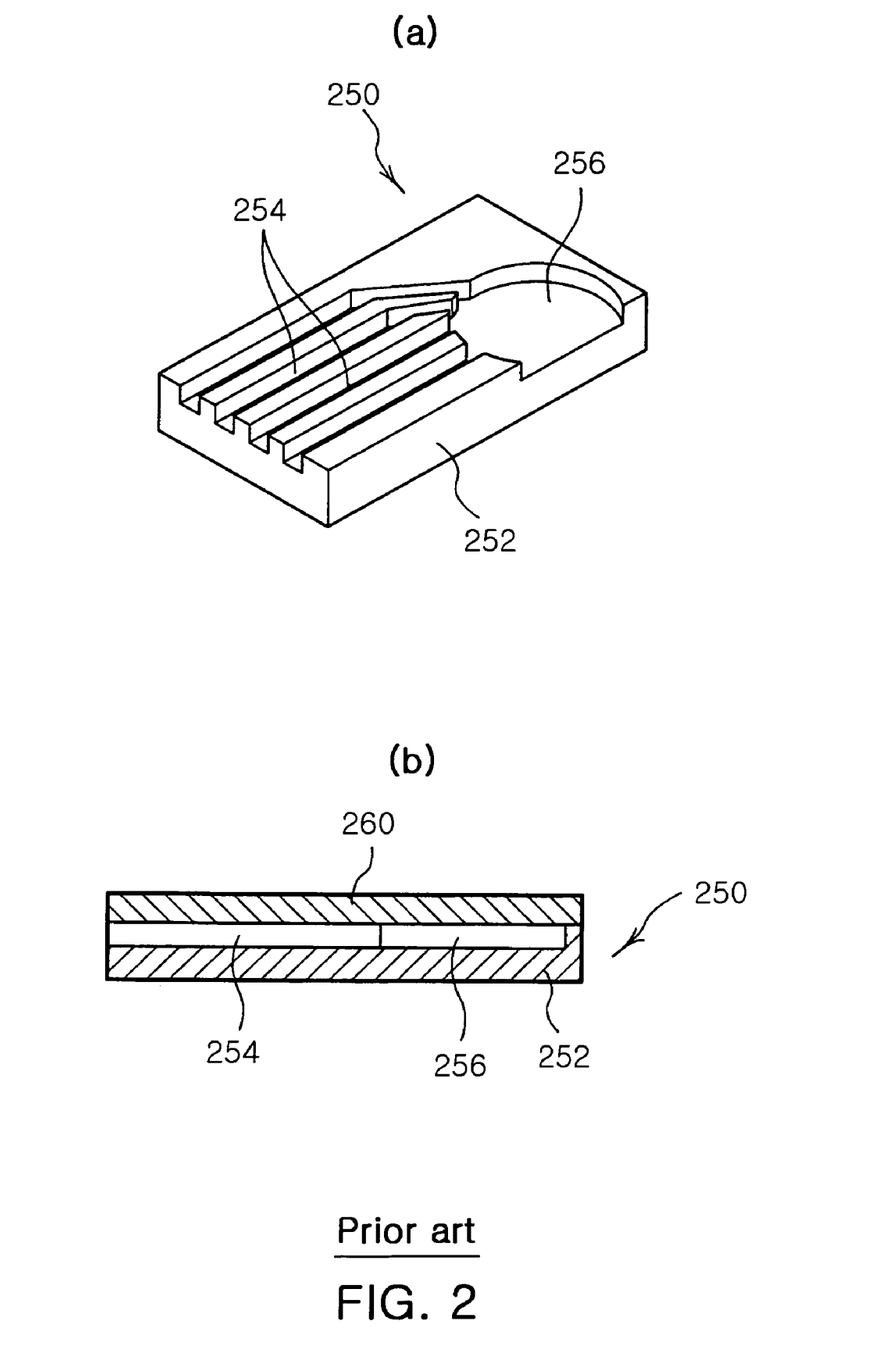
FIG. 2 is a structural view illustrating another conventional reforming apparatus in which (a) is a perspective view and (b) is a sectional view.

FIG. 2 illustrates another conventional reforming apparatus 250 suggested in Japanese Patent Application Publication No. 2005-166453. In this conventional technology, a fuel cell is miniaturized to enable efficient reformation of a large amount of fuel with a micro reforming apparatus. Also, a silicon substrate 252 has micro channels 254 and a reforming space 256 formed therein. Catalysts are formed in the micro channels 254 and the reforming space 256 to reform hydrocarbon fuel and generate hydrogen. The micro channels 254 and the reforming space 256 are covered by a cover plate 260.

However, in such a conventional reforming apparatus 250, liquid fuel expands as it is gasified, and thus a large-capacity, high-pressure pump (not shown) is required to inject the fuel into the channels 254.

Figure 3:
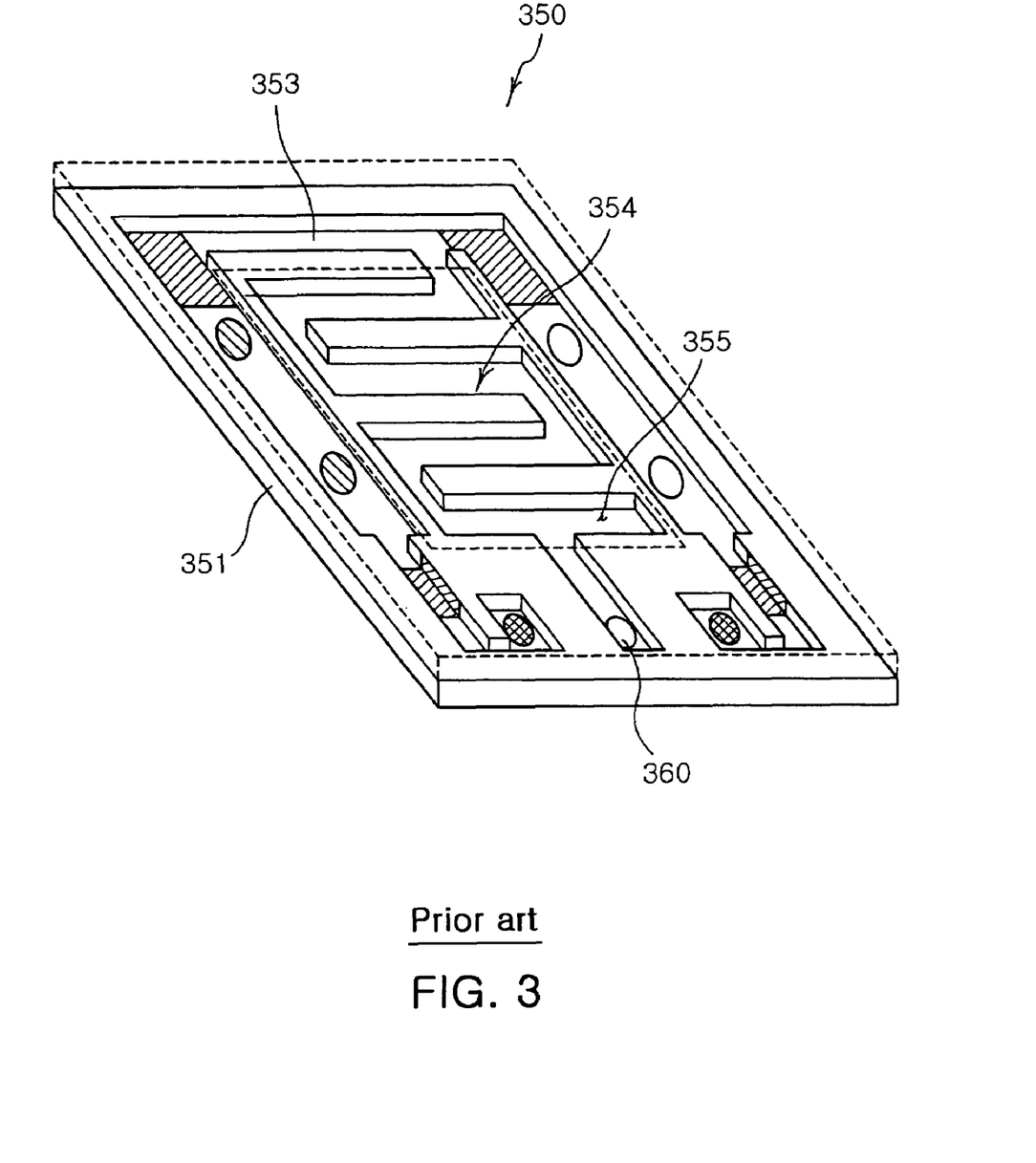
FIG. 3 is a perspective view illustrating further another conventional reforming apparatus.

FIG. 3 illustrates further another conventional reforming apparatus 350 suggested in Japanese Patent Application Publication No. 2004-89748. In this conventional technology, a flow path is expanded at a side of a substrate 351 to provide a gassifier 353. A reformer 354 and a CO remover 355 are disposed successively downstream of the gassifier 353, and a hydrogen outlet 360 is formed downstream of the CO remover 355. Even though the flow path is expanded in the gassifier 353, the conventional technology does not adequately address the problem of back pressure occurring as the liquid fuel is gasified and expanded.

Therefore, the conventional reforming apparatuses have disadvantages in that as the fuel is converted to gas in the evaporator, the volume of the fuel expands instantaneously and the back pressure has an influence toward the fuel inlet portion to interfere with the inflow of the fuel. Therefore, there is a need in the art for a thin micro reformer having an improved structure of the evaporator to allow fuel inflow at low pressure, and miniaturized with excellent reforming capacity.

SUMMARY OF THE INVENTION

The present invention has been made to solve the foregoing problems of the prior art and therefore an object of certain embodiments of the present invention is to provide a thin micro reforming apparatus which has a modified structure of an evaporator to supply the fuel in the form of droplets from the center of the substrate, thus increasing the ratio of the surface area of the fuel to the volume of the fuel, thereby enhancing the evaporating efficiency given the same amount of heat.

Another object of certain embodiments of the invention is to provide a thin micro reforming apparatus which can effectively suppress backflow of liquid fuel being supplied due to back pressure occurring as the liquid fuel expands instantaneously.

Further another object of certain embodiments of the invention is to provide a thin micro reforming apparatus which has an enlarged space of an evaporator to ensure a sufficient space for gas expansion, significantly decreasing back pressure generated from the evaporator to a fuel inlet portion and allowing the back pressure generated from the evaporator to compensate for the decrease in the internal pressure due to the expanded flow path, thereby achieving pressure equilibrium in the evaporator.

Yet another object of certain embodiments of the invention is to provide a thin micro reformer which divides an evaporator region into a gas expansion part and a back pressure accommodation part to suppress the increase of back pressure, inducing efficient gas flow, thereby achieving miniaturization and improving the capacity of the reforming apparatus.

According to an aspect of the invention for realizing the object, there is provided a thin micro reforming apparatus including: a substrate having a flow path therein; a fuel inlet portion for introducing fuel into the flow path of the substrate; an evaporator including a gas expansion part formed downstream of the fuel inlet portion, the gas expansion part gasifying the liquid fuel and a back pressure accommodation part accommodating back pressure during the gasification to block the influence of the back pressure to the fuel inlet portion; a reformer having a flow path formed downstream of the evaporator, the reformer reforming fuel into hydrogen gas via heat absorption reaction; a CO remover having a flow path formed downstream of the reformer, the CO remover removing CO gas contained in the hydrogen gas via heat generation reaction; and a cover for covering an upper part of the substrate to seal the substrate from the external environment.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 4:
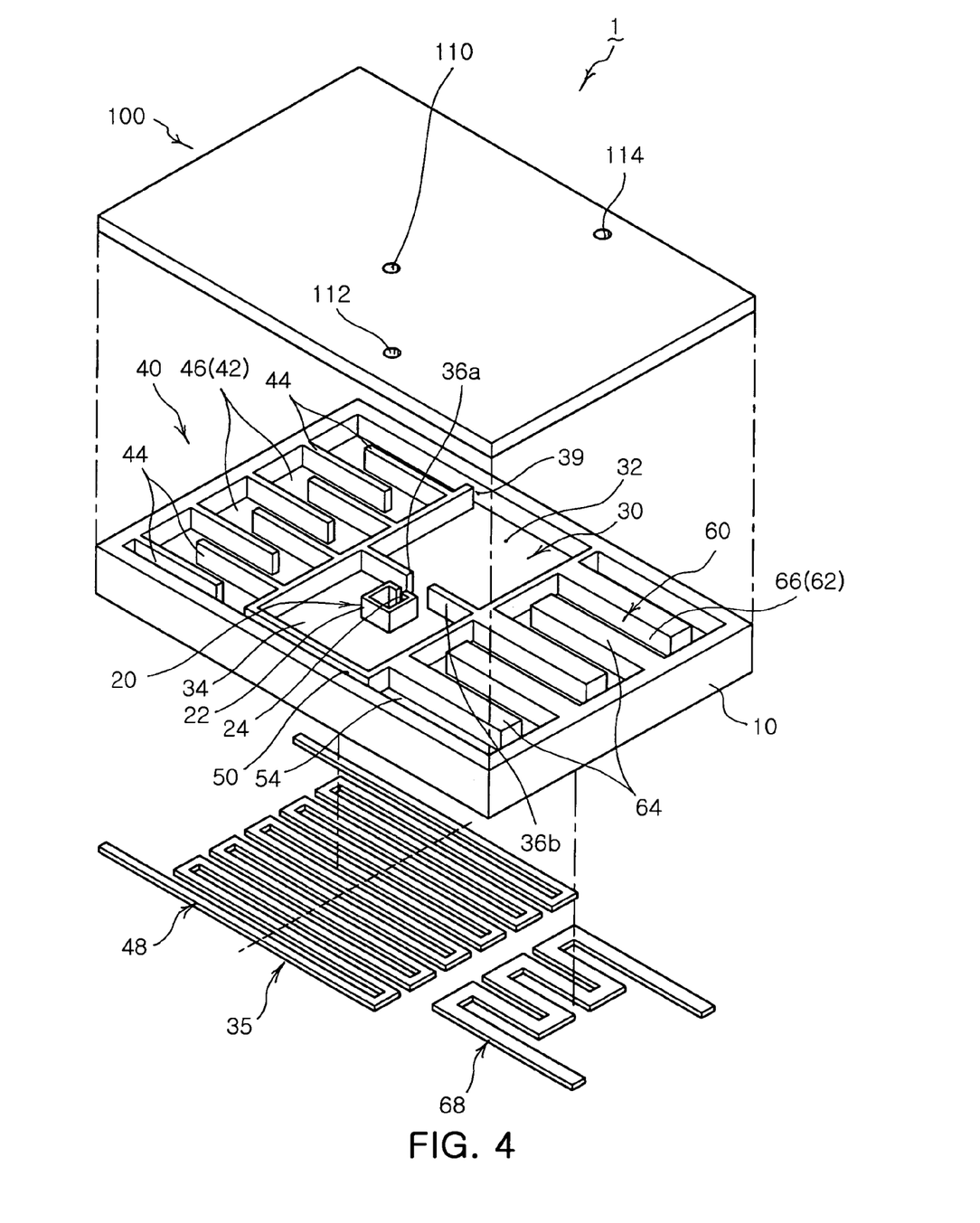
FIG. 4 is an exploded perspective view illustrating a thin micro reforming apparatus according to the present invention.

As shown in FIG. 4, the thin micro reforming apparatus 1 includes a substrate 10 with flow paths formed therein. The substrate 10 may be made of silicon, metal, glass and heat-resistant plastic. The substrate 10 has one side etched to form the recessed flow paths therein, defined in a predetermined form by partition walls.

That is, the substrate 10 has one side etched to form a desired form of recessed flow paths therein.

Figure 5:
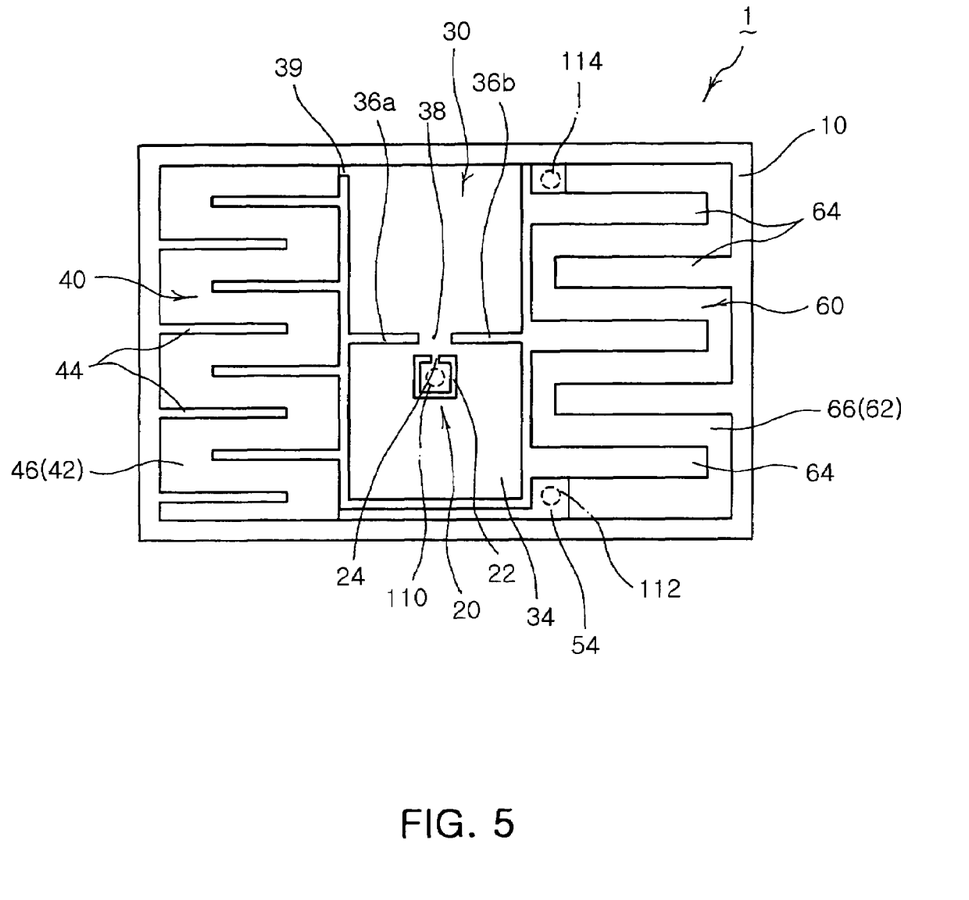
FIG. 5 is a plan view illustrating the thin micro reforming apparatus according to the present invention.

The substrate 10 has a fuel inlet portion 20 in a central portion thereof for introducing fuel into the flow paths. As shown in FIG. 5, the fuel inlet portion 20 is formed in about a central portion of the substrate 10. The fuel inlet portion 20 is defined by partition walls 22 formed in the substrate 10 and has a narrow opening 24 formed in the partition walls 22 to allow supply of drops (droplets) of the liquid fuel to an evaporator 30 explained later.

Preferably, the partition walls 22 of the fuel inlet portion 20 form a rectangular section, and has the opening 24 formed at a side thereof to allow supply of the liquid fuel.

As described above, when the liquid fuel is injected, the opening 24 of the fuel inlet portion 20 serves to discharge a small amount of the liquid fuel as droplets, thereby increasing the evaporation efficiency given the same amount of heat. And because of the narrow dimension of the opening 24, the pressure is high at the location where the methanol is discharged from the fuel inlet portion 20, and thus serves to counteract the back pressure occurring as the liquid fuel is converted to gas fuel.

In order to supply methanol, the liquid fuel, into the fuel inlet portion 20, a cover 100 attached to an upper part of the substrate 10 has a fuel inlet hole 110 formed in about a center thereof.

At an exit side of the fuel inlet portion 20, an evaporator 30 is formed to heat and gasify the liquid fuel. The evaporator 30 gasifies the liquid fuel and supplies the fuel in a gaseous state to allow effective reforming reaction of the fuel in a reformer 40 described later. The evaporator 30 is positioned in about the center of the substrate 10, surrounding the fuel inlet portion 20.

The evaporator 30 includes a gas expansion part 32 where the liquid fuel is gasified in the substrate 10, and a back pressure accommodation part 34 which accommodates the back pressure during the gasification of the fuel, in order to minimize the back pressure during the gasification of the liquid fuel in the evaporator 30 and deter the back pressure from influencing the fuel inlet portion 20.

Figure 6:
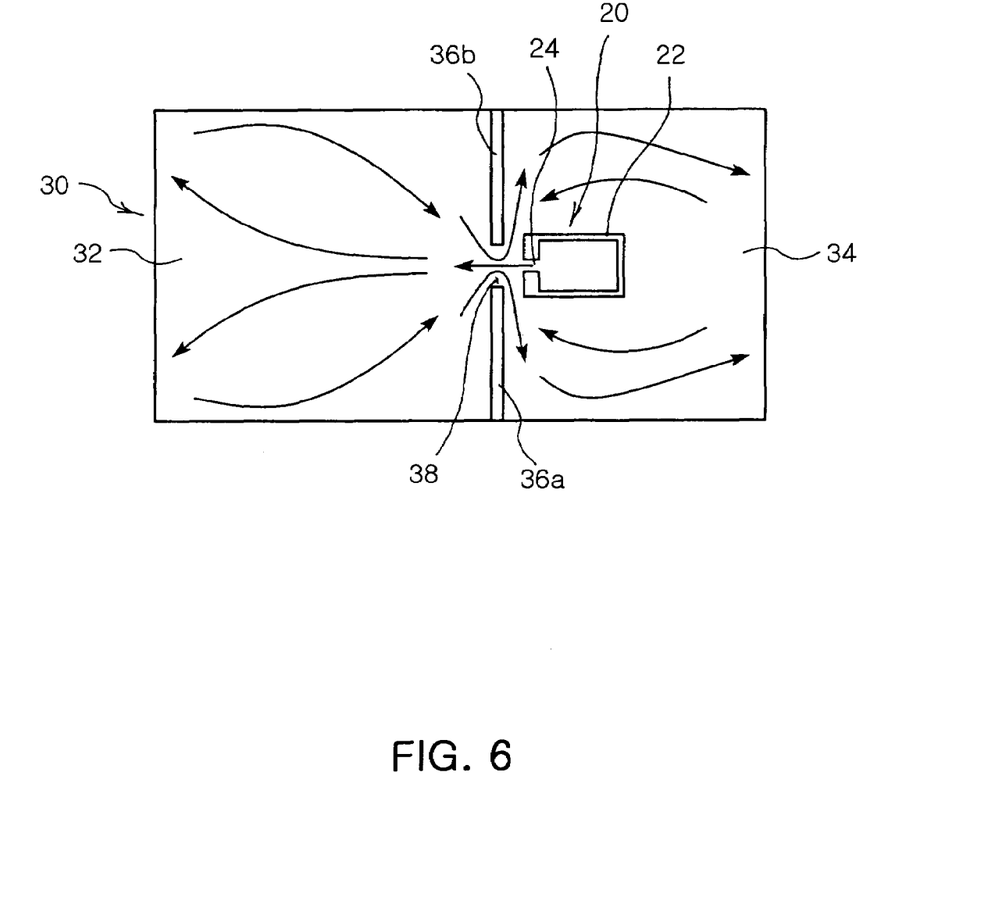
FIG. 6 is a view illustrating the gas flow in an evaporator of the thin micro reforming apparatus according to the present invention.

That is, as shown in FIGS. 5 and 6, the gas expansion part 32 and the back pressure accommodation part 34 are divided by a plurality of partition walls 36a and 36b formed along the center line of the evaporator 30. A passage 38 is formed between the partition walls 36a and 36b, adjacent to the opening 24 of the fuel inlet portion 20 as shown in FIG. 5.

The passage 38 is formed larger than the opening 24 so that as described later, when the liquid fuel flows from the fuel inlet portion 20 to the gas expansion part 32, the gas fuel is allowed to flow from the gas expansion part 32 to the back pressure accommodation part 34, around the liquid fuel.

Such an evaporator 30 has a large open space in the gas expansion part 32 so that when the volume of fuel increases due to conversion from liquid to gas as the methanol is gasified, a maximum space for evaporation is ensured. This minimizes the increase of the back pressure due to the volume increase of the gas, thereby ensuring stable evaporation in the evaporator 30.

In addition, the gas expansion part 32 and the back pressure accommodation part 34 are divided from each other by the plurality of partition walls 36a and 36b formed across the center of the evaporator 30 and in communication with each other through the passage 38 formed between the partition walls 36a and 36b. Thus, the back pressure increased in the gas expansion part 32 is delivered to the back pressure accommodation part 34 through the passage 38, thereby further deterring the increase of the back pressure in the evaporator 30. In addition, the back pressure accommodation part 34 surrounds the fuel inlet portion 20 and is distinguished from the fuel inlet portion 20 by the partition walls 22 of the fuel inlet portion 20 excluding the opening 24 of the fuel inlet portion 20.

Figure 9:
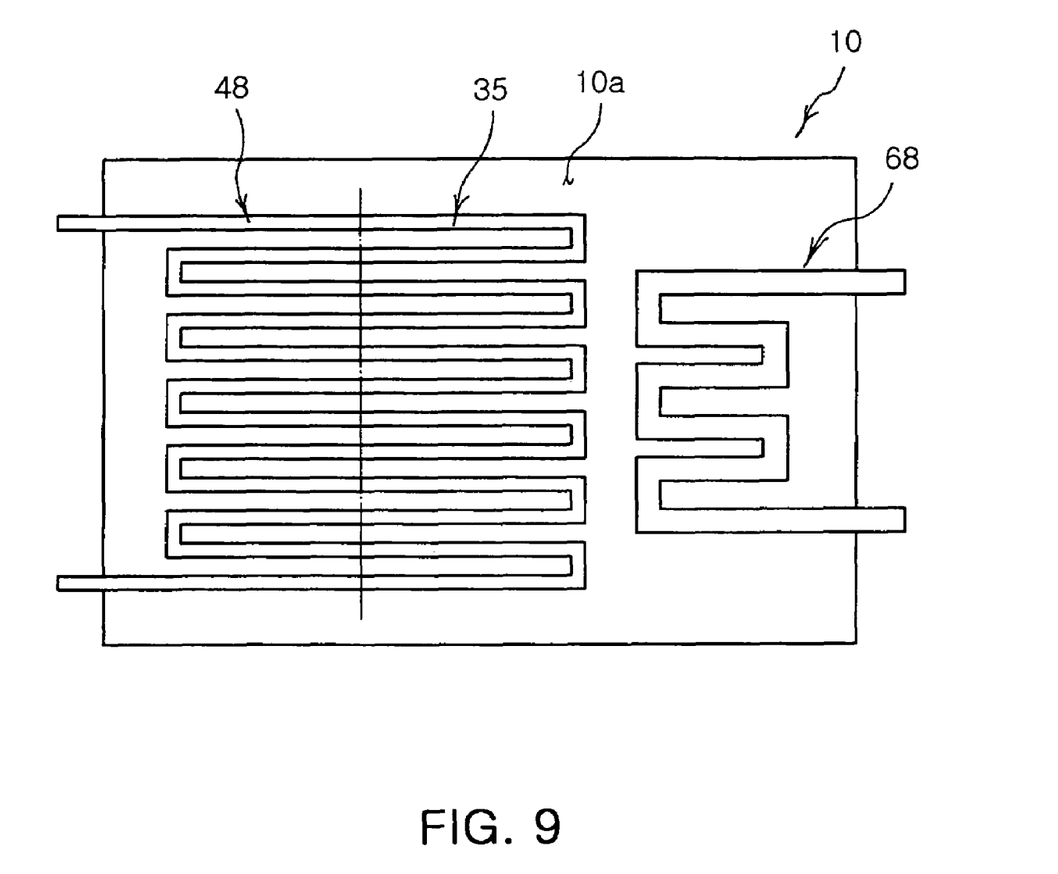
FIG. 9 is a bottom view illustrating a heater in the form of an electrically resistive circuit pattern formed on a lower surface of the substrate.

Moreover, the evaporator has a heater 35 as a heat source. As shown in FIG. 9, the heater 35 is formed as an electric resistance circuit patterned on a bottom surface 10a of the substrate 10 to heat the overlying evaporator 30 via the substrate 10.

The thin micro reforming apparatus 1 of the present invention also includes the reformer 40 formed at an exit side 39 of the evaporator 30. The reformer 40 has a flow path 42 through which the fuel flows, and reforms the fuel into hydrogen gas via heat absorption reaction. The reformer 40 is formed downstream of the exit side 39 of the evaporator 30, biased toward one side of the substrate 10, and thus the flow path 42 is connected to the evaporator 30 through the exit side 39. The flow path 42 of the reformer 40 is formed in a predetermined serpentine pattern by partition walls 44.

Therefore, the flow path 42 of the reformer 40 is formed in a zigzag shape in the entire length of the reformer 40, and the flow path 42 of the reformer 40 has a catalyst 46 formed therein for reforming the liquid fuel into hydrogen gas. In the reformer 40, the gasified fuel is converted to hydrogen-rich reformed gas via catalytic reaction. The catalyst 46 of the reformer 40 is made of $Cu/ZnO$ or $Cu/ZnO/Al_2O_3$ and is preferably formed on the partition walls 44 via deposition.

Alternatively, rather than being deposited on the partition walls 44, the catalyst may be filled in the flow path 42 in the form of particles, so that the fuel gas flows through gaps between the particles.

Figure 8:
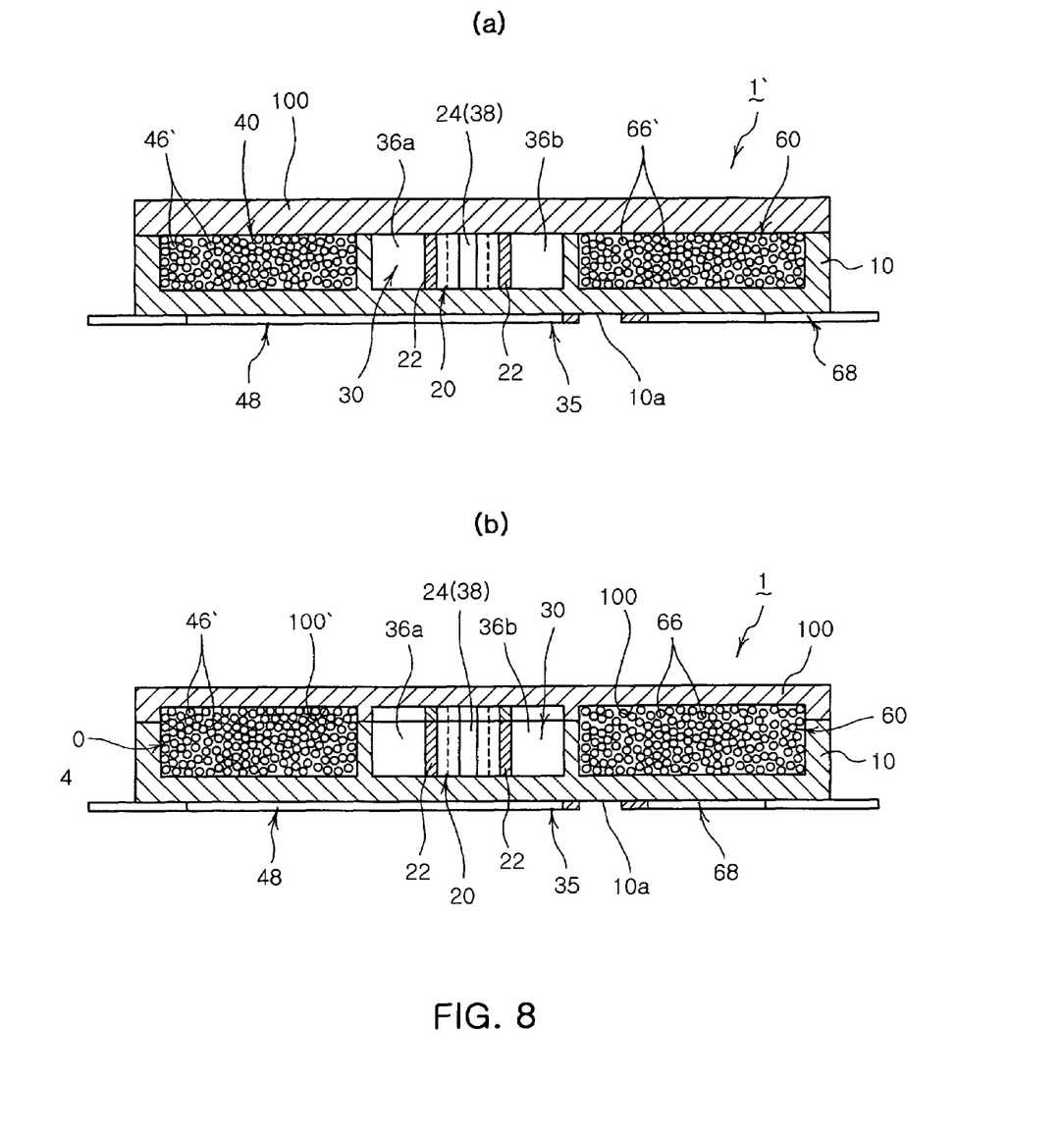
FIG. 8 is a sectional view illustrating a thin micro reforming apparatus having a particle-type catalyst according to another embodiment of the present invention, in which (a) is a sectional view illustrating the plane structure of the cover and (b) is a sectional view illustrating the cover having a recessed flow path.

That is, as shown in FIG. 8, in the reforming apparatus 1' according to another embodiment, the catalyst 46' may be filled in the flow path 42 of the reformer 40 as particles made of $Cu/ZnO$ or $Cu/ZnO/Al_2O_3$. In this case, the particles of the catalyst 46' may be sized such that they do not slip into the evaporator 30 at the front side of the reformer 40 or into a connection part 50 at the back side of the reformer 40.

As described above, the reformer 40 reforms hydrocarbon-based fuel into hydrogen gas via catalytic reaction accompanying heat absorption reaction, and a heater 48 formed on a lower part of the substrate 10 provides a heat source needed in this process. The heater 48 is formed as an electric resistance circuit patterned on a bottom surface of the substrate 10 and heats the overlying reformer 40 via the substrate 10. The heater 48 may be configured as an electric resistance circuit pattern integrally formed from a heater 35 of the evaporator 30.

As shown in FIG. 9, the heater 48 of the reformer 40 is formed on a bottom surface 10a of the substrate 10 to maintain the reformer 40 at a predetermined temperature, preferably, 250 to 290° C. via the substrate 10.

Furthermore, the reforming apparatus 1 of the present invention also includes a CO remover 60 having a flow path formed downstream of the reformer 40 in the substrate 10. The CO remover 60 removes CO contained in the reformed gas produced from the reformer 40.

The CO remover 60 has the flow path 62 formed in a portion of the substrate 10 opposite to the reformer 40 and removes CO gas contained in the hydrogen gas via heat generation reaction.

Such a CO remover 60 is supplied with the reformed gas containing hydrogen gas, carbon monoxide and carbon dioxide produced from the reformer 40 through the narrow connection part 50 having constricted cross-section. The connection part 50 is extended in parallel to the periphery of the substrate 10 and connected to an enlarged flow path portion 54 having an expanded inner area from the connection part 50.

The hydrogen gas, carbon monoxide and carbon dioxide contained in the reformed gas passes through the small-area of the narrow connection part 50, and is emitted to the larger-area of the enlarged flow path portion 54. Thus, the pressure falls down at this particular portion of the reforming apparatus 1, and the reformed gas enters the CO remover 60 in a low pressure state.

In the meantime, the CO remover 60 has the flow path 62 formed by a plurality of partition walls 64 similar to the reformer 40. A cover 100 attached onto the substrate 10 has an air inlet 112 formed therein corresponding to an entrance side of the flow path 62, i.e., the enlarged flow path portion 54.

In addition, the flow path 62 has a catalyst 66 formed therein via deposition, etc. for removing CO gas produced in the reformer 40.

In the CO remover 60, the reformed gas from the reformer 40 reacts with oxygen in the air to remove CO. The catalyst 66 used in such a CO remover 60 is preferably made of one selected from a group consisting of Pt, Pt/Ru and $Cu/CeO/Al_2O_3$.

Alternatively, as shown in FIG. 8, the catalyst 66 formed in the CO remover 60 may be a particle-type catalyst 66'. That is, the catalyst 66' may preferably comprise particles made of one selected from a group consisting of Pt, Pt/Ru and $Cu/CeO/Al_2O_3$.

The particles of the catalyst 66' of the CO remover 60 may be sized such that it does not slip into the enlarged flow path portion 54 at an entrance side of the CO remover 60 or out of a reactive gas outlet 114 at an exit side of the CO remover 60.

The CO remover 60 converts CO which is harmful to the human body into harmless $CO_2$ via catalytic reaction accompanying heat generation reaction, and a heater 68 for CO remover formed on the bottom surface 10a of the substrate 10 provides a heat source needed in this process.

As shown in FIG. 9, the heater 68 of the CO remover 60 is provided as an electric resistance circuit patterned on a bottom surface of the substrate 10 to heat the overlying CO remover 60 via the substrate 10.

The heater 68 of the CO remover 60 is provided as an electric resistance circuit pattern to maintain the CO remover 60 at a predetermined temperature, preferably, 170° C. to 200° C. with appropriate power supply and regulation.

Figure 7:
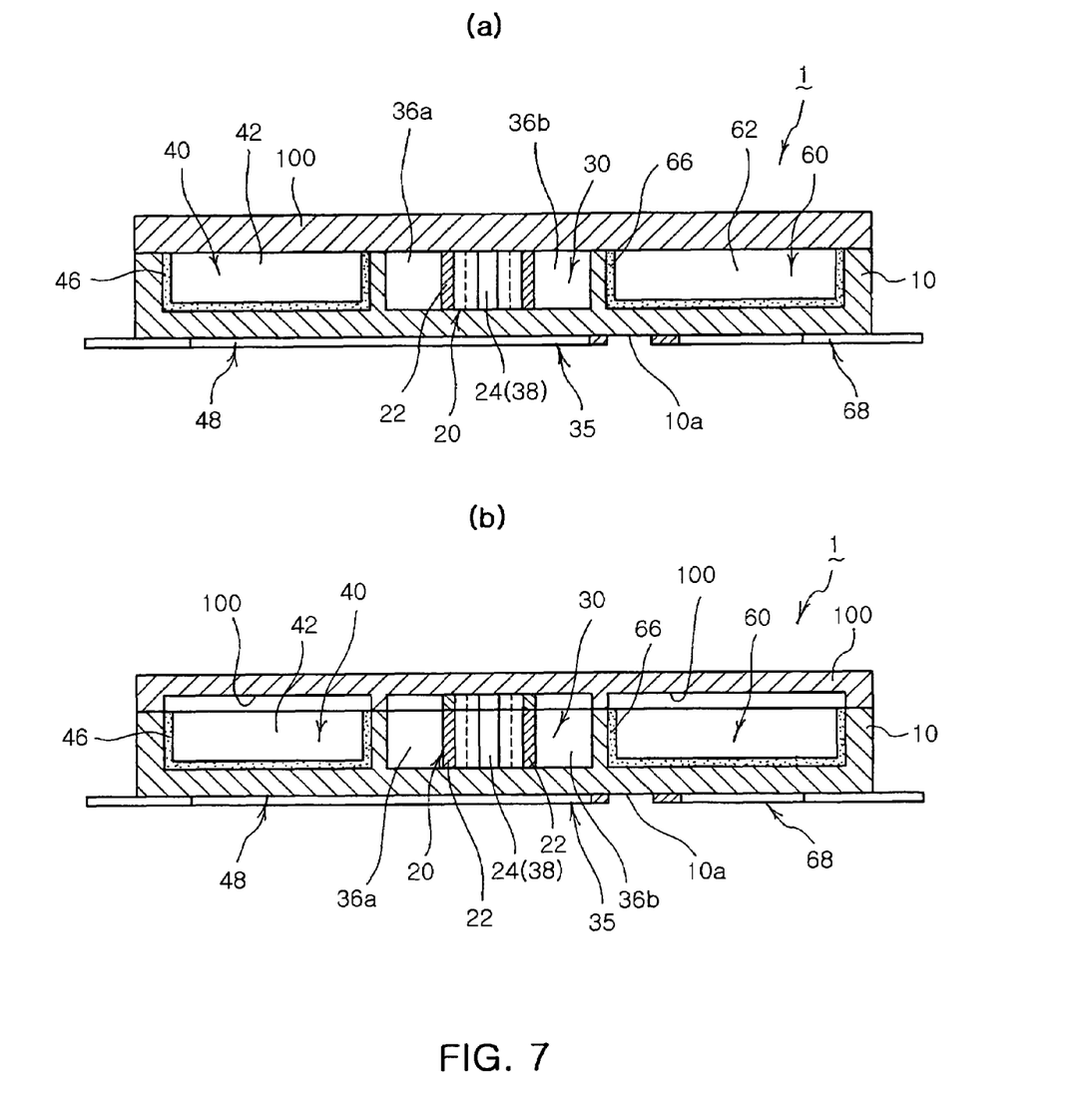
FIG. 7 is a sectional view illustrating a thin micro reforming apparatus according to an embodiment of the present invention in which (a) is a sectional view illustrating a plane cover and (b) is a sectional view illustrating the cover having a recessed flow path.

In addition, as shown in FIGS. 7(a) and 8(a), the reforming apparatus 1 of the present invention includes the plane cover 100 which covers an upper part of the substrate 10 to seal the inner space of the substrate 10 from the external environment. The cover 100 may be made of the same material, as the substrate 10, including silicon, metal, glass, ceramics and heat-resistant plastic, and may be integrally attached to an upper surface of the substrate 10 via bonding.

In addition, as shown in FIGS. 7(b) and 8(b), the cover 100 may preferably have recessed spaces or flow paths 100' formed therein corresponding to the spaces or the flow paths of the flow inlet portion 20, the evaporator 30, the reformer 40 and the CO remover 60, thereby further enlarging the inner space or the dimension of the flow paths formed in the substrate 10 and the cover 100 assembled together.

In addition, the cover 100 integrally attached to the substrate 10 has a reactive gas outlet 114 formed corresponding to an exit side of the flow path 62 of the CO remover 60. That is, the reactive gas containing hydrogen gas and $CO_2$ produced in the CO remover 60 is emitted to the outside through the reactive gas outlet 114 of the substrate 10.

Therefore, the cover 100 has a fuel inlet hole 110 formed corresponding to the fuel inlet portion 20, the air inlet 112 formed corresponding to an entrance side of the CO remover 60, i.e., the enlarged flow path portion 54, the reactive gas outlet 114 formed corresponding to an exit side of the CO remover 60. With this configuration, the liquid fuel is injected through the fuel inlet hole 110, reformed and emitted to the outside through the reactive gas outlet 114 as the reactive gas containing hydrogen gas and $CO_2$.

In the reforming apparatus 1 with the above configuration, the liquid fuel is injected through the fuel inlet hole 110 into the fuel inlet portion 20 disposed in about a center of the substrate 10. The liquid fuel is discharged as droplets from the opening 24 of the fuel inlet portion 20 and supplied into the evaporator 30.

The amount of the liquid fuel supplied into the evaporator 30 is small at about 10 to 100 μm/min. After passing through the fuel inlet portion 20, the liquid fuel enters the gas expansion part 32 through the opening 24 where it is gasified at a temperature required for reformation, i.e., 250 to 290° C., and expanded in volume.

Therefore, in the gas expansion part 32 of the evaporator 30, the fuel is instantaneously increased about 1800 times its original volume during the gasification. At this time, if the evaporator 30 has a narrow space, the increased pressure facilitates delivery of the methanol mixture gas toward the catalyst layer, but the instantaneous increase in the volume causes backflow of the fuel due to the back pressure.

According to the present invention, however, the gas expansion part 32 of the evaporator 30 provides a large space for the gas to be spread out widely, and the gas expansion part 32 is in communication with the back pressure accommodation part 34 through the passage 38 formed in the partition walls 36a and 36b. Therefore, as indicated by the arrows in FIG. 6, the gasified fuel passes around the liquid fuel flowing into the gas expansion part 32 and migrates into the back pressure accommodation part 34. This further suppresses the increase in the back pressure due to the expansion of fuel in the evaporator 30.

The increase in the back pressure due to the gasified liquid, tends to influence the fuel inlet portion 20. However, the opening 24 connecting the fuel inlet portion 20 to the evaporator 30 is formed narrow at about 10 to 100 μm, functioning much like a nozzle. Thus, the internal pressure at the entrance side of the evaporator 30 is high, deterring the backflow of the liquid fuel due to the back pressure.

The fuel gas migrated from the gas expansion part 32 to the back pressure accommodation part 34 as described above flows back to the gas expansion part 32 and enters the reformer 40 formed downstream of the evaporator 30 through the exit portion 39 of the evaporator 30. In the reformer 40, the fuel gas goes through catalytic reaction accompanying heat absorption reaction, and during this process, reformed gas containing hydrogen gas, CO and $CO_2$ is produced at a temperature from 250 to 290° C.

The reformed gas flows to the CO remover 60 downstream through the connection part 50 having a small cross section of the flow path. In this process, the high-temperature, high-pressure reformed gas passes through the narrow connection part 50 and enters suddenly-enlarged area of the enlarged flow path portion 54 and the pressure falls down. Thus, the pressure in the enlarged flow path portion 54 is significantly lower than the reformer 40.

In addition, the reformed gas passes through the CO remover 60 with air being supplied through the air inlet 112 of the cover 100 formed corresponding to the enlarged flow path portion 54.

In the CO remover 60, catalytic reaction of selective oxidation accompanying heat generation reaction takes place at a temperature of about 170 to 200° C. to convert CO in the reformed gas to harmless $CO_2$.

After passage through the CO remover 60, reactive gas containing hydrogen gas and $CO_2$ is produced and emitted to the outside through the reactive gas outlet 114. Moreover, according to the present invention, the air necessary for oxidation reaction in the CO remover 60 has to be supplied from the outside. Particularly, a pump (not shown) which supplies the air through the air inlet 112 of the cover 100 can have small capacity according to the present invention. That is, as the reformed gas passes through the narrow connection part 50 and enters the enlarged flow path portion 54 of the CO remover 60, the pressure is significantly dropped in the enlarged flow path portion 54 from that in the reformer 40 due to the decreased internal pressure. This allows the ambient air to be easily inhaled into the reforming apparatus through the air inlet 112.

Therefore, the pump (not shown) for supplying the air through the air inlet 112 according to the present invention can have smaller capacity than the conventional one.

In addition, in the present invention, the heater 35 is formed below the evaporator 30. Alternatively, however, the heater 35 for the evaporator 30 can be removed from the bottom of the evaporator 30 and only the other heaters 48 and 68 are provided to heat the reformer 40 and the CO remover 60, allowing the evaporator 30 to be heated by the heat transferred from the reformer 40 and the CO remover 60.

According to the present invention as set forth above, the position and structure of the fuel inlet portion and the evaporator can be modified such that the fuel is supplied as drops. This increases the ratio of the surface area to the volume of the fuel, thereby increasing the evaporation efficiency given the same amount of heat.

In addition, with the narrow opening of the fuel inlet portion, the injection pressure of the liquid fuel is increased, thereby effectively suppressing the backflow of the fuel due to the back pressure as the gas is instantaneously expanded.

Moreover, the evaporator has a gas expansion part and the back pressure accommodation part, providing a large space for the expansion of the fuel, thereby significantly decreasing the magnitude of the back pressure occurring in the evaporator. Also, the decrease in the internal pressure in the evaporator due to the large space can be offset by the back pressure occurring during the gasification of the fuel. Therefore, the pressure reaches equilibrium in the evaporator, facilitating the inflow of the liquid fuel.

Furthermore, according to the present invention, the evaporator is adequately divided into the gas expansion part and the back pressure accommodation part to suppress the increase of the back pressure without needing to increase the injection pressure of the fuel, which in turn induces good flow of gas. This ultimately leads to miniaturization and improved reforming capacity of the apparatus.

While the present invention has been shown and described in connection with the preferred embodiments, it will be apparent to those skilled in the art that modifications and variations can be made without departing from the spirit and scope of the invention as defined by the appended claims.

What is claimed is:

1. A thin micro reforming apparatus comprising:
a substrate having a flow path therein;
a fuel inlet portion for introducing fuel into the flow path of the substrate;
an evaporator formed in the substrate including a back pressure accommodation part located behind the fuel inlet portion, the back pressure accommodation part accommodating back pressure during the gasification to block the influence on the back pressure to the fuel inlet portion and a gas expansion part formed downstream of the fuel inlet portion, the gas expansion part gasifying the liquid fuel;
a reformer having a flow path formed downstream of the evaporator, and formed in one side of the substrate, the reformer reforming fuel into hydrogen gas via endothermic reaction;
a CO remover having a flow path formed downstream of the reformer, and formed in the other side of the substrate, the CO remover removing CO gas contained in the hydrogen gas via an exothermic reaction; and
a cover for covering an upper part of the substrate to seal the substrate from the external environment,
wherein the evaporator is divided into the gas expansion part and the back pressure accommodation part by a plurality of partition walls, and wherein the gas expansion part and the back pressure accommodation part are in communication with each other through a passage formed between the partition walls,
the passage is formed larger than the opening of the fuel inlet portion so that when liquid fuel enters the gas expansion part from the fuel inlet portion, the gas fuel is allowed to flow from the expansion part to the back pressure accommodation part, around the liquid fuel.

2. The thin micro reforming apparatus according to claim 1, wherein the fuel inlet portion is formed at about a central portion of the substrate.

3. The thin micro reforming apparatus according to claim 2, wherein the fuel inlet portion has partition walls formed in the substrate and an opening formed in the partition walls to supply droplets of liquid fuel.

4. The thin micro reforming apparatus according to claim 1, wherein the passage is formed adjacent to the opening of the fuel inlet portion.

5. The thin micro reforming apparatus according to claim 1, wherein the evaporator has a heater as an electric resistant circuit patterned on a bottom surface of the substrate to heat the evaporator via the substrate.

6. The thin micro reforming apparatus according to claim 1, wherein the reformer and the CO remover are connected with a connection part, the connection part having a constricted cross-section is extended in parallel to the periphery of the substrate.

7. The thin micro reforming apparatus according to claim 6, wherein the connection part has an inner area smaller than that of the flow path of the reformer and the CO remover.

* * * * *